Figure 1:
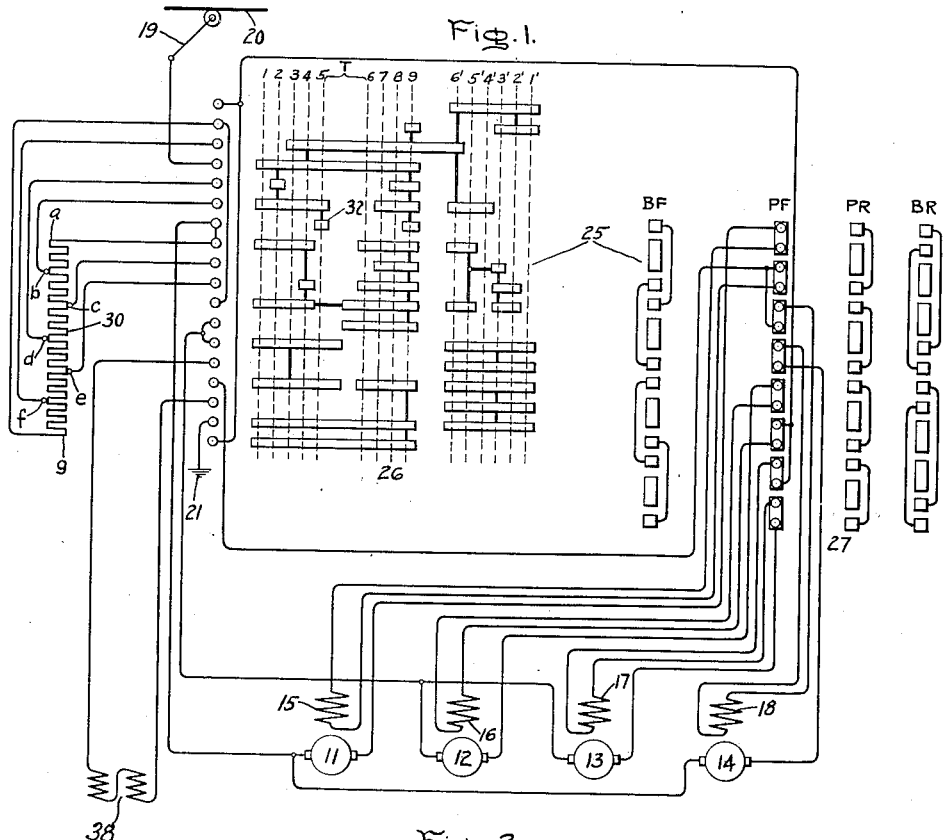

Dec. 18, 1934.   C. J. AXTELL   1,985,070
SYSTEM OF MOTOR CONTROL
Filed June 2, 1932

Inventor:
Clinton J. Axtell,
by Charles E. Tullar
His Attorney.

Patented Dec. 18, 1934

1,985,070

UNITED STATES PATENT OFFICE 1,985,070

SYSTEM OF MOTOR CONTROL

Clinton J. Axtell, Erie, Pa., assignor to General Electric Company, a corporation of New York Application June 2, 1932, Serial No. 614,949

3 Claims. (Cl. 172—179)

My invention relates to a system of motor control, particularly to control systems for traction drives and the like employing a plurality of motors arranged to be connected together in different combinations to provide controlled acceleration and deceleration of the motors in an efficient and simple manner.

In such systems as applied to railway drives, a master controller operable through a plurality of positions has been arranged to connect the driving motors in series with each other and with an accelerating resistor. The controller then served to decrease the resistance until it had been excluded from the motor circuit. The motors were then connected in parallel combinations with each parallel combination in series with a section of the resistor. For the final step required in accelerating the motors to their full speed the resistor was excluded from the motor circuits. It has also been common practice in the past to cross-connect the series field windings of a single pair of motors for the braking operation, this connection being known as the anti-run-back connection. The advantage of this connection is well uderstood ad provides braking in case the direction of rotation of the motor acting as a generator is reversed.

As a result of the cross-connection, however, an oscillating current circulated through the armature circuit with the result that motors of somewhat larger capacity have been necessary in order to withstand the additional heating effect caused by the oscillating current. Furthermore, the braking effect due to the oscillating current can not be controlled.

In carrying out my invention in one form thereof, I substantially eliminate the oscillatory current set up in the motor circuit by cross connecting the series field windings of one pair of motors and connecting in series with this pair of motors a second pair of motors with their series field windings also cross connected. By these connections I have found as the result of many tests including normal operating conditions, that the oscillatory current has been eliminated to such an extent that the additional heating attributed to this source has been reduced to a negligible amount, if not entirely eliminated.

Inasmuch as the two pairs of parallel connected motors are connected in series during braking, it will be understood that the voltage is twice the voltage the motors would generate if all the motors were connected in parallel for braking. Consequently, the resistance which must be included in the braking circuit must be correspondingly greater for the first point of braking if the same rate of deceleration is to be retained.

It is a further object of my invention to provide a single resistor having the desired value of resistance to give the proper rate of deceleration for the first point of braking and to utilize all sections of the resistor for the several steps of acceleration as well as deceleration. In accomplishing this feature of my invention one section of resistance is connected in parallel with the remaining sections of resistor for the first step acceleration and for successive steps of acceleration additional sections of the resistor are paralleled.

Figure 2:
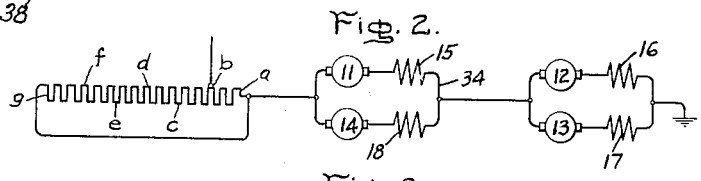
Figure 3:
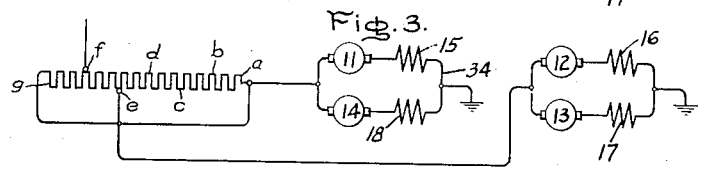

For a more complete understanding of my invention, reference should now be had to the drawing wherein I have illustrated in Fig. 1 a development of the master controller together with the motor connections diagrammatically illustrated. Fig. 2 shows the connections established for the first step of acceleration, Fig. 3 illustrates the connections established for the first step of acceleration after the motors have been connected in parallel, while Fig. 4 shows a simplified form of the braking connections which are established on the first step of braking.

Referring now to the drawing, I have shown my invention in one form as applied to the control of the direct current traction motors 11, 12, 13 and 14, respectively provided with series field windings 15, 16, 17 and 18. These motors are energized from a trolley 19 normally in engagement with a supply conductor 20. A ground connection 21 completes the provision for the supply of power to the motors. It will be observed that the master controller 25 is provided with a main drum 26 having nine positions 1—9 for acceleration and six positions 1'—6' for braking. The main drum 26 in conjunction with an auxiliary drum 27 serves to interconnect the motors for any desired operation. For example, in the position shown in the drawing the motors are connected for power forward. If the vehicle or locomotive which the motors are driving is to be moved in the reverse direction the drum 27 is moved to the position PR for reverse power. The two extreme positions BF and BR provide the connections for braking forward or braking for the reverse direction of rotation of the motors.

Figure 4:
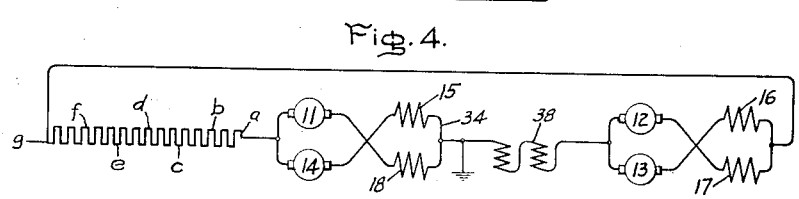

The resistance of the resistor 30 is selected with reference to the dynamic braking circuit shown in Fig. 4 so that on the first step of dynamic braking the resistor 30 is of sufficiently high resistance to give the desired rate of deceleration for this step in braking. The relatively high value of resistance is required because of the series connection of the motors which connection results in a correspondingly higher generated voltage. For the first point of acceleration the voltage applied to the motors is much less than the generated voltage during braking so that the equivalent resistance connected in the motor circuit is reduced by connecting the section *ab* of the resistor 30 in parallel with the remaining sections *b—g* of the resistor for the first step in acceleration. The connections established in step 1 are shown in Fig. 2. For the positions 2 and 3 of the main drum 26 the value of the resistance included in the motor circuit is reduced by respectively short circuiting sections *bd* of the resistance 30 and the section *bf* of the resistors 30. For the fourth position of the main drum the trolley 19 is connected to the resistor 30 at the points *b* and *f* while the motors 11 and 14 are connected to the resistors at the points *a*, *e* and *g* and in position five of the main drum the motors are directly connected to the trolley 19 by means of the conducting segment 32.

It should here be observed that if the braking connections are desired at any time during acceleration, it is only necessary to operate the main drum 26 towards the braking position. The auxiliary drum 27 is mechanically interlocked with the main drum 26 in a manner well understood in the art, so that when the main drum 26 is moved from the power position to a braking position, the auxiliary drum 27 is automatically operated to the BF position, thereby establishing the dynamic braking connections shown in Fig. 4. The rate of deceleration is increased by moving the controller through the braking positions 1'—6' inclusive.

Continuing with the operation of my invention the next step in the acceleration of the motors to their full speed is the operation of the main drum 26 from position 5 to position 6, or through the section designated as T, for the transition of the motor connection from the series combination to the parallel combination shown in Fig. 3. The conventional shunted motor transition from series to parallel connections is utilized. Briefly, the motors 11 and 14 are shunted by a resistance, while the motors 12 and 13 remain connected to the source of power so as to continue the application of torque to the vehicle or locomotive. The parallel connections established for the 6th position of the controller are shown in Fig. 3. The same amount of resistance is connected in series with the motors 11 and 14 as is connected in the circuit to the motors 12 and 13. Consequent to the movement of the drum 26 through the positions 7, 8 and 9 the equivalent resistance of the resistor 30 is successively reduced until it is entirely removed from the motor circuit at position 9 and the motors are then accelerated to their full speed.

If it were not for the use of a single resistor designed for the dynamic braking combination, the circuit would be considerably complicated, particularly if provision were to be made for establishing dynamic braking by the rotation of the drum 26 to the braking positions.

It will now be assumed that the drum 26 has been rotated to the braking position. The movement of the drum 26 to the braking position, it will be remembered, rotates the auxiliary drum 27 to its braking position to establish the dynamic braking connection shown in Fig. 4. It will be observed that the armature of the motor 11 is connected in series with the field winding 18 of the motor 14 and while the field winding 15 of the motor 11 is connected in series with the armature of the motor 14. This connection forms the conventional anti-run-back connection for braking. Connected in series with the motors 11 and 14 is the resistor 30 and the motors 12 and 13 with their field windings cross-connected in the same manner as described for the motors 11 and 14. A brake operating coil 38 may also be included in the closed series circuit and intermediate the field windings 15 and 18 and the brake coil 38 is a ground connection which prevents damage to the braking coil 38 and motor windings in case of abnormally high voltages produced by the motors.

In order to increase the braking effort it is only necessary to rotate the drum 26 through the positions 1' to 6' inclusive, the result of which rotation is the successive reduction of the equivalent resistance of the resistor 30 until in the last position 6' all of the resistance is short circuited from the braking circuit.

As I have stated, the cross connections of the field windings 18 and the inclusion of the second pair of motors 12 and 13 with their field windings 16 and 17 cross connected substantially eliminates oscillating current from flowing in the local circuit including the armatures and field windings of the respective pairs of motors.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States, is,—

1. In a motor control system, the combination of four motors, a series field winding for each motor, a motor controlling resistor provided with a plurality of sections, a master controller operable in one direction through a plurality of motoring positions for connecting two of said motors in parallel with each other and in series with a second set of motors connected in parallel with each other, for connecting one section of said resistor in parallel and the remaining sections of said resistor in the first of said controller positions to permit the flow of a predetermined value of current to said motors, and for successively reducing the equivalent value of said resistor when said controller is operated through said additional positions, and connections established by the movement of said controller in an opposite direction through a plurality of braking positions for connecting said pairs of motors in series with each other with the field windings of each pair of motors cross connected, said controller when in said first braking position completing a closed circuit including all of said sections of said resistor whereby said braking current is limited to a value substantially less than the current permitted to flow to said motor on said first step of motoring.

2. In a motor control system, the combination of two pairs of motors, a series field winding for each motor, a resistor provided with a plurality of sections, a master controller operable in one direction through a plurality of motoring positions and in an opposite direction through a plurality of braking positions, connections completed by the operation of said master controller to its first braking position for cross connecting the field windings of each pair of said motors to form anti-run-back connections and for connecting said pairs of motors in series circuit relation with each other and with all of said sections of said resistor to prevent oscillating current in said anti-run-back braking connections and to limit said braking current to a predetermined value, and connections completed by the operation of said controller to said first motoring position for connecting sections of said resistor in parallel with each other, whereby a lower value of resistance is connected in series circuit relation with said pairs of motors for the first step of motoring than is connected in series circuit relation for the first step of braking whereby said resistor is utilized both during motoring and braking operations of said motors.

3. A control system for controlling the acceleration and deceleration of a locomotive or the like, comprising a plurality of driving motors therefor, a single resistor provided with a plurality of sections having a predetermined resistance value, control means for connecting said motors in closed series circuit relation with each other and with said resistor for dynamic braking, said predetermined resistance value being such as to limit the current in said closed series circuit to a desired value, a source of supply, said control means being operable to connect said motors to said source of supply in series circuit relation with said resistance for motoring operation, said control means at the same time connecting sections of said resistor in parallel circuit relation with other sections of said resistor during said motoring operation so as to utilize all of said resistor during said motoring operation and during said dynamic braking.

CLINTON J. AXTELL.